(12) United States Patent
Fields, Jr. et al.

(10) Patent No.: US 8,190,939 B2
(45) Date of Patent: May 29, 2012

(54) REDUCING POWER CONSUMPTION OF COMPUTING DEVICES BY FORECASTING COMPUTING PERFORMANCE NEEDS

(75) Inventors: Mahlon David Fields, Jr., Kirkland, WA (US); Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 420 days.

(21) Appl. No.: 12/493,058

(22) Filed: Jun. 26, 2009

(65) Prior Publication Data

US 2010/0332876 A1     Dec. 30, 2010

(51) Int. Cl.
*G06F 1/32*     (2006.01)
(52) U.S. Cl. ................ 713/324; 713/320; 713/323
(58) Field of Classification Search .............. 713/323
See application file for complete search history.

(56) References Cited

U.S. PATENT DOCUMENTS

| | | | |
|---|---|---|---|
| 5,339,445 A | 8/1994 | Gasztonyi | |
| 5,781,783 A | 7/1998 | Gunther et al. | |
| 5,996,084 A | 11/1999 | Watts | |
| 7,028,200 B2 | 4/2006 | Ma | |
| 7,224,563 B2 | 5/2007 | Naffziger | |
| 7,379,884 B2 * | 5/2008 | Barsness et al. | 705/63 |
| 7,386,747 B2 | 6/2008 | Dockser | |
| 7,797,563 B1 * | 9/2010 | Moll et al. | 713/324 |
| 8,015,423 B1 * | 9/2011 | Satterfield et al. | 713/322 |
| 2003/0204759 A1 * | 10/2003 | Singh | 713/320 |
| 2006/0184287 A1 * | 8/2006 | Belady et al. | 700/291 |
| 2007/0049133 A1 * | 3/2007 | Conroy et al. | 439/894 |
| 2009/0013201 A1 | 1/2009 | He et al. | |
| 2009/0049312 A1 | 2/2009 | Min | |
| 2010/0037038 A1 * | 2/2010 | Bieswanger et al. | 712/220 |
| 2010/0218005 A1 * | 8/2010 | Jain et al. | 713/300 |

OTHER PUBLICATIONS

Benini, et al., "Policy Optimization for Dynamic Power Management", retrieved on Mar. 10, 2009 at <<http://ieeexplore.ieee.org/stamp/stamp.jsp?arnumber=766730&isnumber=16613>>, IEEE Transactions on Computer-Aided Design of Integrated Circuits and Systems, vol. 18, No. 6, Jun. 1999, pp. 813-833.
Pallipadi et al., "Processor Power Management Features and Process Scheduler: Do We Need to Tie Them Together?", Intel White Paper, Aug. 2007, 8 pgs.

* cited by examiner

*Primary Examiner* — Ryan Stiglic
(74) *Attorney, Agent, or Firm* — Lee & Hayes, PLLC

(57) ABSTRACT

Techniques and systems are provided that work to minimize the energy usage of computing devices by building and using models that predict the future work required of one or more components of a computing system, based on observations, and using such forecasts in a decision analysis that weighs the costs and benefits of transitioning components to a lower power and performance state. Predictive models can be generated by machine learning methods from libraries of data collected about the future performance requirements on components, given current and recent observations. The models may be used to predict in an ongoing manner the future performance requirements of a computing device from cues. In various aspects, models that predict performance requirements that take into consideration the latency preferences and tolerances of users are used in cost-benefit analyses that guide powering decisions.

20 Claims, 8 Drawing Sheets

REDUCING POWER CONSUMPTION OF COMPUTING DEVICES BY FORECASTING COMPUTING PERFORMANCE NEEDS

BACKGROUND

Computing devices are using increasing percentages of total generated electric power. Power consumption management of computing devices provides an opportunity for making more ideal use of resources and for reducing the carbon footprint of computing devices. Beyond fiscal and environmental benefits, power management can also prolong device operation when a portable device is constrained to use limited battery resources. By employing careful management of power consumption, mobile computing devices may perform additional work by leveraging power conserved from each charge of a battery that may have otherwise been needlessly used by powering underutilized resources, allowing longer usage as well as for enhanced experiences such as usage for enhanced displays.

Traditional power conservation techniques often rely on user adjustments to power usage by allowing users to specify and choose relatively static policies for allocating power to devices. For example, a user may adjust a power setting to control processor speed, dim/brighten a display, or enable/disable a device. In addition, processors often include power management features that enable the processor to operate at various power consumption modes or states, such as an active state, a low power state, an idle state, or a sleep state. Some policies allow for the changing of resource usage via measures of sensed idle times, such as dimming a display when user activity is not observed for some specified amount of time.

On a finer grain, processors often include logic to adjust the power consumption mode based on real-time processing demand and policies can be invoked by manufacturers and users to control the tradeoffs between the performance and efficiency of a processor and its power consumption.

Although most components of a computing device use power during operation, the processor uses a disproportionate share of the computing device's power. Many computing devices include multiple processors and/or processors with multiple cores, which further provide an incentive to reduce power consumption of the processors.

SUMMARY

Techniques and systems are provided to control the powering of CPU (or other components) that minimize power consumption via proactively reducing the power state of the CPU (or other components) based on predictions about near-term future demands on a CPU (or other device) and/or predictions about the future latency tolerances of users. In some aspects, predictive models that can be used to generate these two forecasts in real time may each be constructed from case libraries of data that links observations about the activities of users and the future workloads handled by components of a computing device. Such models can be used to make forecasts in real time by considering the recent and present activities of users and the workload being handled by one or more components of a computing device. A forecast of future performance requirements of the computing device may then be generated based on the active cues whereby the forecast includes low workload (work requirement) segments based on the analyzed past and present workloads that may be translated into low performance segments to save power.

In various aspects, a component of a computing device can be actively set to one of several reduced power states, based on the output of predictive models that continue to forecast the usage of the component and/or the forthcoming latency tolerance by users. A decision analysis, employing a cost-benefit analysis can balance the savings that come with a switching to a lower power state for some duration and the costs of transitioning back to a higher power state to address a forthcoming computational need and the cost associated with the risk of an undesirable latency in the responsiveness of the computing system to an application, another device, or a user. In still further aspects, the computing device may defer the scheduling of low priority tasks and to bundle the handling of recurrent low priority tasks that are not required for real-time operation so as to allow for longer idle time resulting in reduced power demands. In some aspects, a target tolerated latency threshold may be determined for the computing device based on a usage context. A user-perceived latency of the reduced power state of the low workload segment may then be predicted for the near-term future and this information can be used along with other information to predict the impact of lowering the power state of one or more components. The computing device may use predictions about the future power requirements and tolerations for latency to adjust the reduced power state to reduce the user-perceived latency below a target latency threshold.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
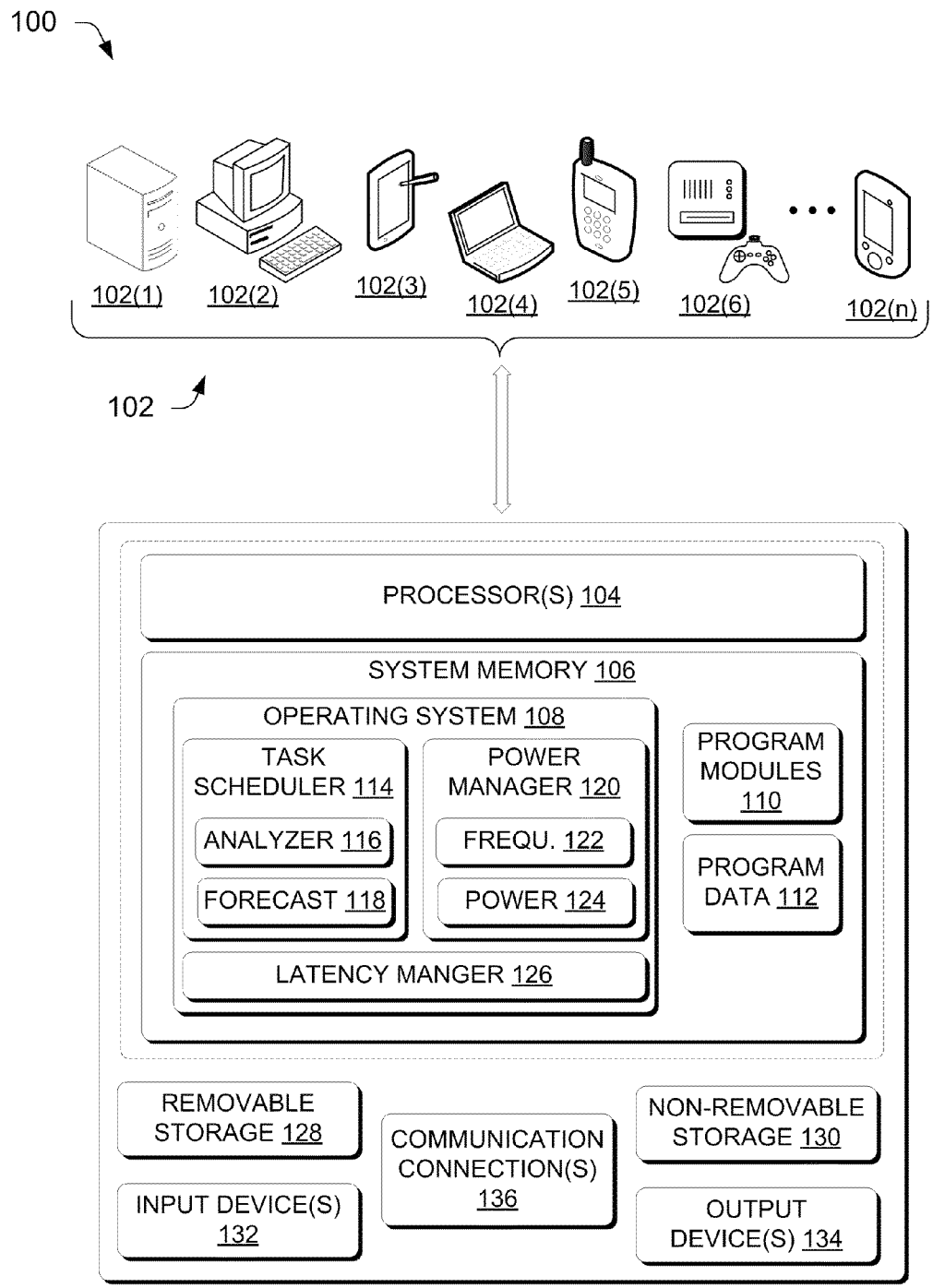
FIG. 1 is a schematic diagram of an illustrative computing architecture to generate power-requirement forecasts to minimize power consumption of a computing device.

In a most basic sense, hardware may be either powered on (in operation) or powered off (not in operation). However, various computing hardware, in particular computing device processors, are capable of operating in reduced power states (modes). For example, more complex devices, such as processors, may include various power states such as a low power state, an idle state, and so forth, which allow varying degrees of low power operation. Unfortunately, a power debit may occur when a processor is transitioned from a higher power state to a lower power state which may negate power savings in some instances.

To enable optimum power state selection, an operating system may perform a cost-benefit analysis on the expected utility of transitioning a component to a lower power state for some time or until an observation or state is identified. The analysis may identify a breakeven point of a minimum duration of a predicted forthcoming segment where low power is required that results in a realization of power savings for the hardware, considering the costs of transitioning the component back to a state required for a future operation, and the expected costs of latency induced by the operation under uncertainty about user activity and needs.

A forecast may be continually or intermittently inferred from a predictive statistical model or a derivation of such a model such as a tree or compiled table generated from historical data collected about computing hardware operation and interaction with users, and such forecasts may be used in ongoing decisions about powering components based on one or more observations. The forecast may include an expectation of low performance segments—time where one or more components can be powered down based on expectations of forthcoming workloads, performance expectations, and latency tolerances. The forecasts are used in real-time or compiled by cost-benefit analyses that determine when it is beneficial to make a change in the power level and thus the status of one or more components. In some embodiments, predicted idle or low-performance requiring segments may also be used to perform other tasks, such as scheduling low priority tasks when the forecasted length of the low performance segment is not long enough to justify a reduction in power state.

As idle or low-power requiring times can be disrupted by processes that are intermittent low priority processes, separate tools and mechanisms can be designed to bundle lower priority processes by deferring them to operate simultaneously or in tight sequence so as to maximize the number and durations of states where one or more components can be idled and set to lower power-requiring states.

Processors may facilitate the execution of up to billions of executions per second. While having such a high capacity for executing computer instructions, processors may have considerable variance in workload over short periods of time. For example, periods as short as a delay between a typist's keystrokes (e.g., milliseconds) may enable the operating system to reduce hardware power momentarily or enter a brief sleep state. Although a fraction of a second of power may seem negligible, over longer periods of time the cumulative power savings may be significant.

In addition to power costs, user-perceived latency is another important consideration that may be used to determine when to power down or power up hardware. A latency threshold may be integrated in the cost-benefit analysis to enable achieving a power savings while avoiding undesirable delays in processing which may impact user satisfaction.

The processes and systems described herein may be implemented in a number of ways. Example implementations are provided below with reference to the following figures.

Illustrative Environment

FIG. 1 is a schematic diagram of an illustrative computing architecture 100 to generate power-requirement forecasts to minimize power consumption of a computing device. The architecture 100 includes a computing device 102. For example, the computing device may be a server 102(1), a desktop computer 102(2), a tablet 102(3), a mobile computer 102(4), a mobile telephone 102(5), a gaming console, and a music player 102($n$), among other possible computing devices. As discussed herein, any reference of the computing device 102 is to be interpreted to include any of the computing devices 102(1)-($n$).

In a very basic configuration, computing device 102 may typically include one or more processors ("processors") 104. For example, the processors 104 may be at least one of multiple independent processors configured in parallel or in series in a multi-core processing unit, either singly or in various combinations. A multi-core processor may have two or more processors ("cores") included on the same chip or integrated circuit. The terms "processor," "core," and "logical processor" may be used interchangeably throughout this disclosure unless specifically stated otherwise with reference to a particular element.

In addition, the computing device 102 may include system memory 106. Depending on the exact configuration and type of computing device, system memory 106 may be volatile (such as RAM), non-volatile (such as ROM, flash memory, etc.) or some combination of the two. System memory 106 may include an operating system 108, one or more program modules 110, and may include program data 112.

In accordance with one or more embodiments, the operating system 108 may include a task scheduler 114 to enable queuing, scheduling, prioritizing, and dispatching units of work (threads), among other possible schedule-related activities, across all available processors 104 or other hardware (e.g., monitors, memory, disk drives, peripheral devices, and so forth) in the architecture 100. For example, when an active thread is ready to be run, the task scheduler 114, via one or more modules, may dispatch the thread to any available one of the processors 104 for processing.

In accordance with some embodiments, the task scheduler 114 may include an analyzer module 116 that monitors computing activities (user generated activities, hardware operation, application state, etc.). The analyzed schedules may be used by a forecast module 118 to forecast a workload of the computing device 102. The forecast may include low volume segments where a power reduction may be foreseeably achieved by reducing the power state of the processor(s) 104 and/or other hardware of the computing device 102 or in connection to the computing device.

The operating system 108 may include a power manager 120 to adjust the performance of the processors 104 and/or hardware when a reduced power need is anticipated by the forecast module 118. A frequency module 122 may enable adjustment of the speed of the processors 104 and/or hardware (via frequency and voltage) such as by controlling a P-state (frequency/voltage controller) of the processors 104. In addition, the power manager 120 may include a power module 124 that may reduce the power (performance) state of the processors 104 and/or hardware to low power (performance) states, such as by controlling a C-state of the processors.

The task scheduler 114 and the power manager 120 may work collectively to reduce power consumption of the computing device 102 by forecasting performance-requirements and then directing hardware to reduce power states (via the frequency module 122 and/or the power module 124) when a cost-benefit analysis indicates a net power reduction associated with the reduced power state.

In some embodiments, the operating system 108 may include a latency manager 126 to evaluate user-perceived latency associated with the hardware of the computing devices 102 and/or the performance of the program modules 110 as a result of the processors 104. The latency manager 126 may compare the user-perceived latency to a latency threshold as part of controlling the power requirements, (via the power manager 120) when user-perceived latency meets (or exceeds) the latency threshold.

The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage 128 and a non-removable storage 130. The computer storage media may include volatile and nonvolatile, removable and non-removable media implemented in any method or technology for storage of information, such as computer readable instructions, data structures, program modules, or other data. The system memory 106, the removable storage 128 and the non-removable storage 130 are all examples of the computer storage media. Thus, the computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 102. Any such computer storage media may be part of the computing device 102.

The computing device 102 may also have one or more input devices 132 such as a keyboard, a mouse, a pen, voice input device, a touch input device, etc. One or more output device 134 such as a display, speaker, printer, etc. may also be included either directly or via a connection to the computing device 102. The computing device 102 may also include a communication connection 136 that allows the device to communicate with other computing devices over e.g., a network.

Figure 2:
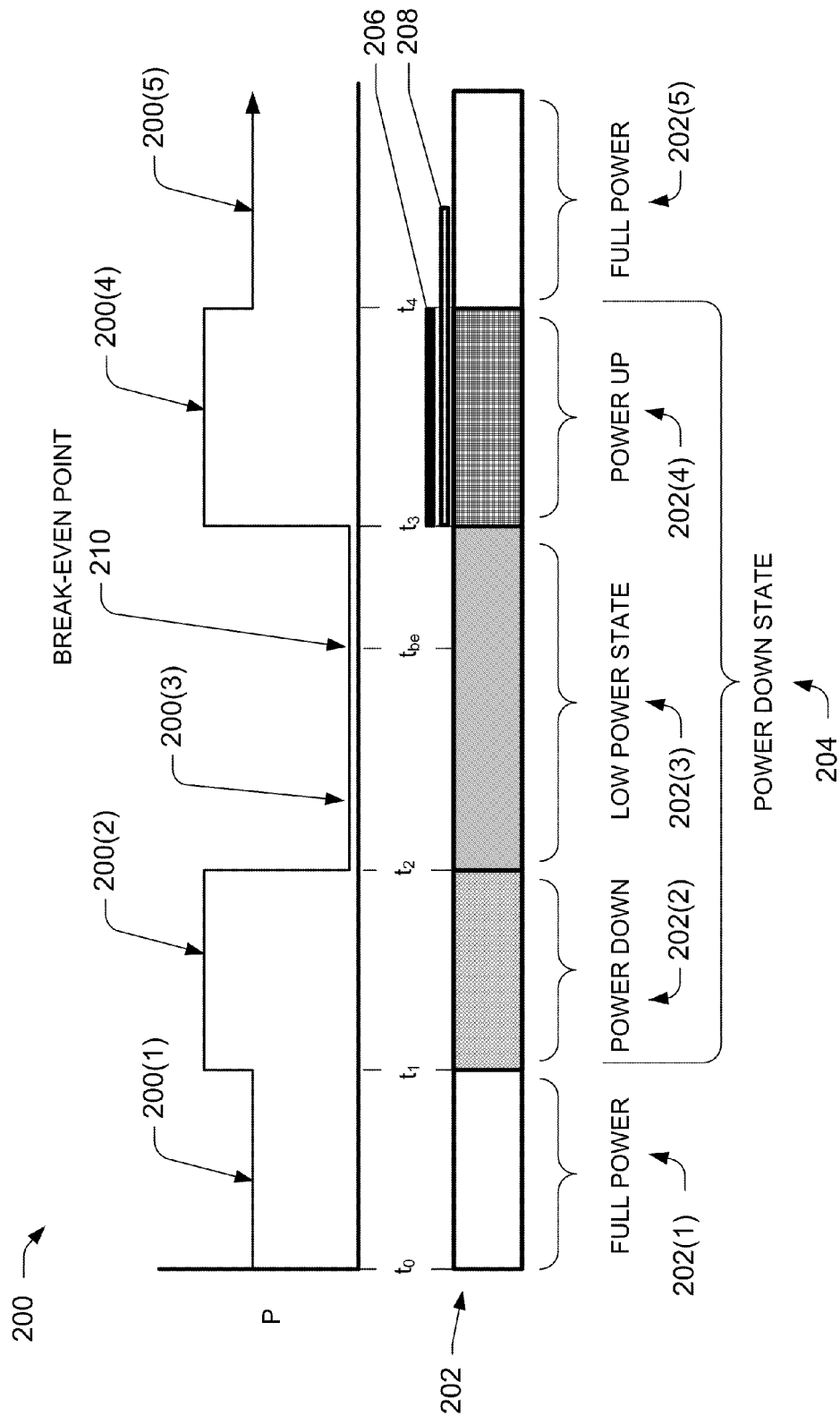
FIG. 2 is a chart illustrating sample power consumption during transitions to and from a low power segment.

FIG. 2 is a chart illustrating a sample power consumption curve 200 during transitions to and from a low power segment. The power consumption curve 200 depicts illustrative power consumption for various power phases 202. For example, normal power phase 202(1) may have an associated full power consumption 200(1), which depicts the relative power consumed during the full power phase. In some embodiments, the normal power phase 202(1) may reflect the processor 104 operating in a C-state of {C-0}, where the C-state also includes a reduced power mode of a processor of {C-1 to C-N]}. However, the C-state may vary between manufacturers. Typically, C-0 is used when the processor is executing instructions (e.g., normal power phase) and C-1 through C-N are used when the processor is in operating modes that enable a reduction in power usage when the CPU is idle.

A reduced power state may occur at time $t_1$, which is the time at which the operating system 108 has directed hardware (e.g., the processor 104, the output devices 134, etc.) to enter a reduced power state. A power-down phase 202(2) corresponds to relative power-down consumption 200(2). The power-down phase 202(2) may reduce power to prepare the hardware for a predicted state of lower workload. For example, the processors 104 may experience power usage by voltage regulators, phase lock loops, and cache memory write-outs, although not exclusively. In particular, power may be consumed when processor cache is emptied by writing out data stored in the cache to non-volatile memory, such as D-RAM.

At time $t_2$, a low power state phase 202(3) may begin, which corresponds to associated low-power consumption 200(3). In some instances, the low-power consumption 200(3) may reflect no power (no watts) or, alternatively, minimal power (e.g., to sustain basic operational tasks). For example, when the directed hardware is the processor 104, the low power state phase 202(3) may be the processor in a C-state of {C1} or greater {C2-C8}. In some C-states, the processor may operate with reduced power consumption (e.g., idle). Some components of the processor 104 may be active (e.g., core) while other components of the processor may be turned off.

At time $t_3$, a power up phase 202(4) may begin at which the hardware may transition from the low power state to a powered state. The power up phase 202(3) corresponds to associated power up consumption 200(4). During the power up, power may be used to rehydrate (replenish) cache (e.g., from D-RAM, etc.) or for other purposes to return the hardware to full operation.

Finally, at time $t_4$, a normal power phase 202(5) may begin, which may correspond to normal power consumption 200(5). In some instances, the normal power phase 202(5) may include a different hardware power setting (e.g., P-state, C-state, etc.) than the normal power phase 202(1) that occurred prior to the low power state phase 202(3).

In accordance with some embodiments, a power down state 204 may be defined between times $t_1$ and $t_4$. During the power down state 204, minimal or no work may be performed by the hardware subjected to the power down state. Thus, the power down state 204 may impact user-perceived latency 206 when the power down state extends beyond an amount of time when the hardware is requested to perform work. A latency threshold 208 may be used by the latency manager 126 to limit an allowable amount of the user-perceived latency 206 during the power down state 204. For example, when the hardware is requested to perform work at time $t_3$ and does not perform work again until time $t_4$, then the user-perceived latency 206 may be the time duration between $t_3$ and $t_4$. Further, the user-perceived latency 206 may be compared to the latency threshold 208. In some embodiments, when the user-perceived latency 206 exceeds the latency threshold 208, then a cost-benefit of the power down state 204 may indicate that the reduced power should not occur due to an unacceptable amount of user-perceived latency 206.

In some embodiments, when the latency is anticipated, such as by an accurate forecast of the workload of the hardware (including an accurate resume power time), then the latency may not be user-perceived because the hardware may return to full power prior to an actual request to perform work. However, when no forecast exists, the hardware may only return to full power upon a request for work, which may then include the user-perceived latency 206 and may be compared to the latency threshold 208.

At time $t_{be}$, a break-even point 210 may be identified as the point in time at which the cost of the low power state (cumulative power from the power down state 202(2) and the power up state (202(4)) is equal to the power savings of the low power state 202(3), based on the predictions of models that forecast future workload and future latency toleration. Therefore, when a duration of the low power state 202(3) extends beyond time $t_{be}$ then the cumulative power usage of the hardware during the power down state 204 is less than a power usage that would have occurred had the power not been reduced for the hardware. By accurately forecasting the workload of the hardware, the hardware may be selectively powered down to the power down state 204 only when the net power saving results in the savings of power, such that time $t_{be}$ occurs prior to time $t_3$.

Figure 3:
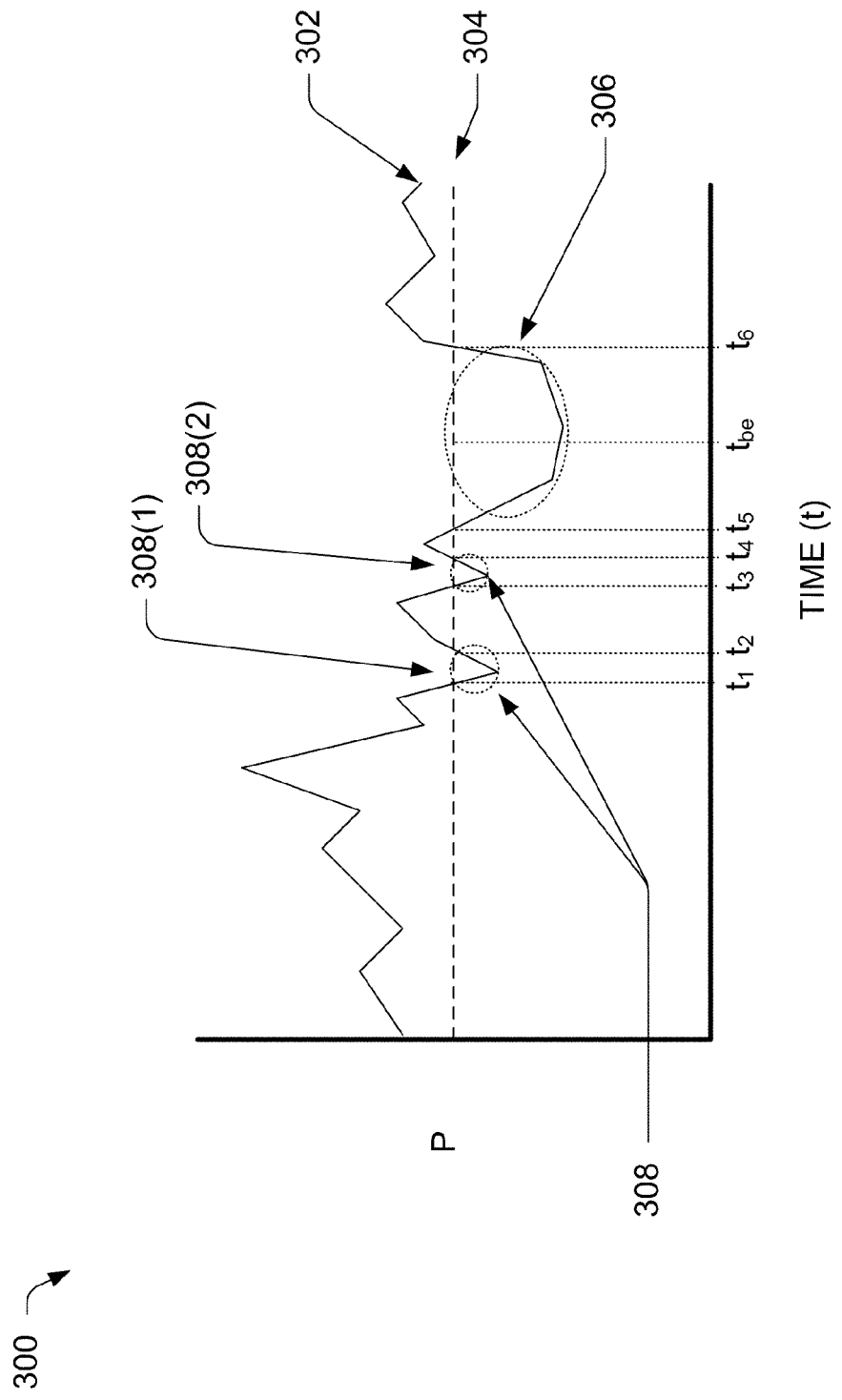
FIG. 3 is a chart illustrating a sample performance-requirement forecast that includes low performance segments.

FIG. 3 is a chart 300 illustrating a sample performance-requirement forecast (or simply "forecast") 302 that includes low performance segments. The forecast 302 depicts a predicted power usage (P) over time (t), where the power usage corresponds to a performance of a computing component (e.g., a processor, etc.). For clarity, the forecast is described in terms of "performance," which correlates to power usage. The chart 300 depicts a relationship of performance (measured by power usage) over time for the forecast 302.

The chart 300 shows a low power threshold 304 at which hardware (e.g., a processor, a hard disk, etc.) may operate at a reduced power state. When the forecast 302 has a power (P) level below the low power threshold 304, the hardware is operating with extra available capacity and may save power by being powered down. Alternatively, additional tasks may be performed during these low segments to more effectively utilize the hardware and maximize work output per unit of power input. The hardware may achieve a cumulative power savings during these low performance segments that correspond to low workload segments when a cost-benefit analysis indicates that, during a reduced power state, a power savings is greater than a power debit associated with a transition to a reduced power state.

The chart 300 may include a low power segment 306 that occurs between $t_5$ and $t_6$. The low performance segments 306 may depict low performance needs of the components (e.g., the processor, etc.). The cost-benefit analysis of the power savings versus the power deficit of entering a reduced power state may indicate that a reduce power state is desirable to obtain cumulative power savings for the low power segment 306. Thus, at time $t_5$, the hardware may enter the power down state 204 as discussed with reference to FIG. 2. At time $t_{be}$, the hardware may begin to experience cumulative power savings during the low power segment 306. The low power segment 306 includes a predicted length, which is the duration of time between $t_5$ and $t_6$.

The forecast of performance requirements 302 may also include short duration (micro) low performance segments 308, which are low performance segments of a shorter duration than the low power segment 306 such that a breakeven point is not achievable between the start and end of the micro power segments 308. Thus, a cost-benefit analysis of the micro power segments 308, such as segment 308(1) from $t_1$ to $t_2$ and 308(2) from $t_3$ to $t_4$, may not result in a cumulative power savings for a reduced power state for hardware.

Figure 4:
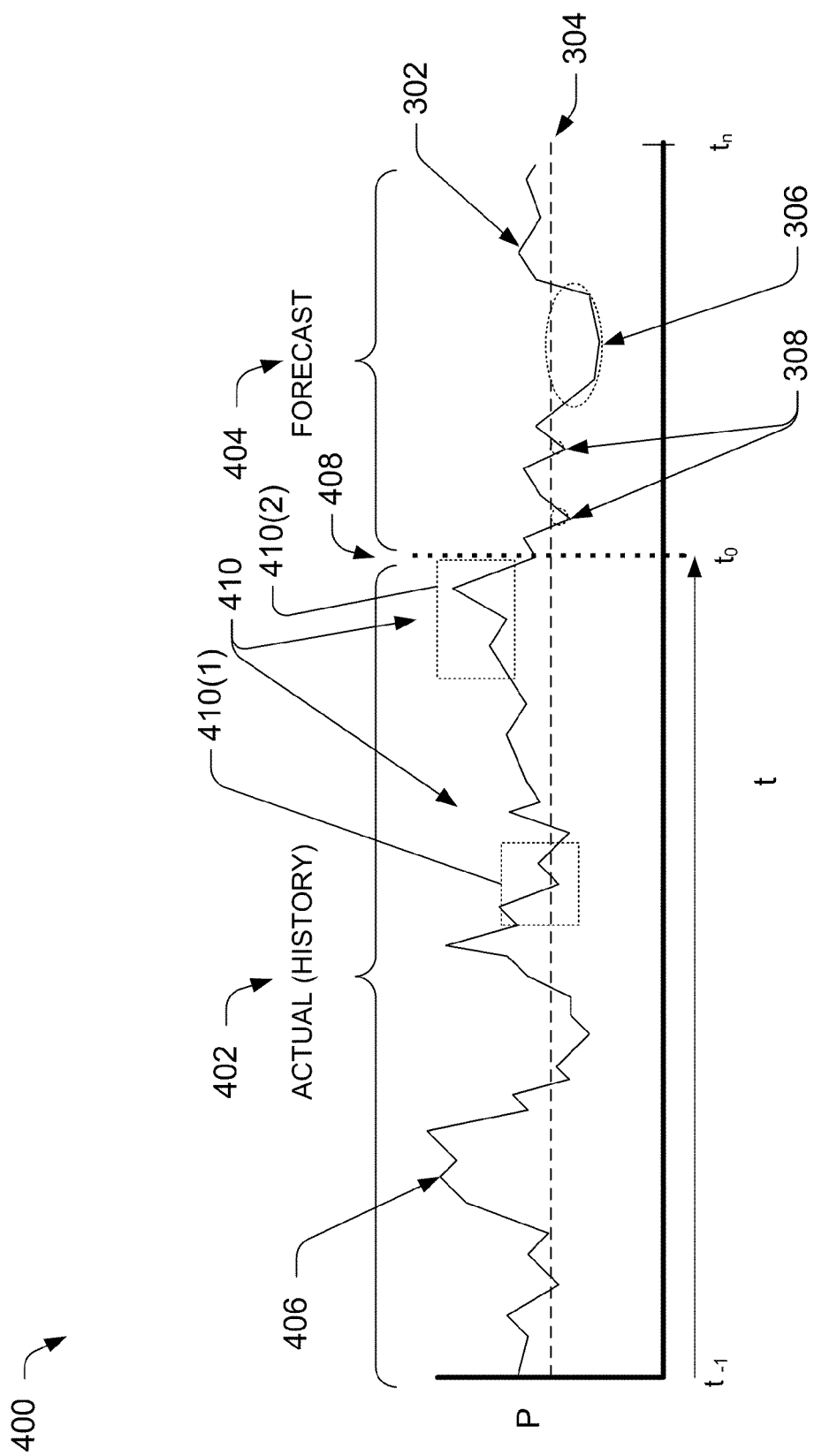
FIG. 4 is a chart illustrating a sample historical power consumption and forecasted performance requirements.

In accordance with various embodiments, low priority tasks may be performed on the hardware during the micro power segments 308, which effectively boost power consumption of the hardware to (or above) the low power threshold 304, thus utilizing the extra available capacity of the hardware to perform work. FIG. 4 is a chart 400 illustrating a sample historical resource consumption 402 and forecasted performance requirements 404 that are predicted to occur after an operation time $t_0$. The forecasted performance requirements were described in part in FIG. 3, and will further be described in FIG. 4 with reference to FIG. 3.

The historical resource consumption 402 may include a history consumption curve 406 that may be tracked (e.g., recorded, etc.) and analyzed by the analyzer module 116 of FIG. 1. The history consumption curve 406 occurs prior to an operational time 408 at time $t_0$, which is the current operational time of the hardware.

The analyzer module 116 may determine a cue 410, which may trigger a prediction of the forecast 302 in the forecasted performance requirements 404. The cue 410 may be an occurrence of an application state, application event (e.g., timer, etc.), user state, sequence of application launches, and so forth, which indicate predicted hardware resource consumption after the cue 410. For example, after a user loads a web page, the hardware may be idle during user "think time" when the user reads text on the web page. In this example, the cue 410 may be the loading of the web page, execution of the browser, etc., while the forecast 302 may be the predicted hardware resource usage (or performance requirement) following the cue 410, which includes the user think time that may align with the low power segment 306. The cue 410 may include user-initiated events, which may be observable by the analyzer module 116 from actions performed by the computing device 102 (e.g., user selection of data, application, etc.).

Although the cue 410 is indicated in the chart 400, the cue is not limited to resource use, but may be represented during a point in time on the chart which correlates with a power usage of the hardware. Thus, the cue 410 may be an independent event (e.g., user selection, application state, etc.) that occurs along the time continuum represented in the chart 400. The cue 410 includes both historical cues 410(1) and active (trigger) cues 410(2). The active cues may be used to trigger a forecasted based on power usage related to a historical cue.

In various embodiments, the predicted hardware usage that is used to create the forecast 302 may be identified by trends represented in the history consumption curve 406. Thus, the power consumption of the forecast 302 may have occurred prior to the operational time 408. The occurrence of the cue 410 may prompt the forecast module 118 to predict the performance requirements and power consumption of the forecast 302 based on the historical performance requirements that occur after a previous occurrence of the cue in the history consumption curve 406.

In accordance with some embodiments, the analyzer module 116 may continually monitor the performance requirements of the hardware to identify the cue 410, which may be used to create the forecast 302. The analyzer module 116 may identify multiple cues, each from similar or disparate sources of data such as application states, operating system state, command sets, user state, device activities, or other cues that are associated with the forecast 302. The forecast module 118 may cumulatively use multiple cues to generate the forecast 302 based on previously observed trends identified by the analyzer module 116 extracted from the history consumption curve 406.

In some embodiments, the history consumption curve 406 may represent the history of other users such that cues are identified and shared between multiple users, such as via a cloud computing environment. Alternatively, the history consumption curve 406 may be specific to a single user to create the cue 410. Learning of the cue 410 may be performed in real time or over a set period of time. For example, data prior to time $t_{-1}$ may be disregarded as outside of a learning time frame defined between $t_{-1}$ and $t_0$.

Illustrative Operation

Figure 5:
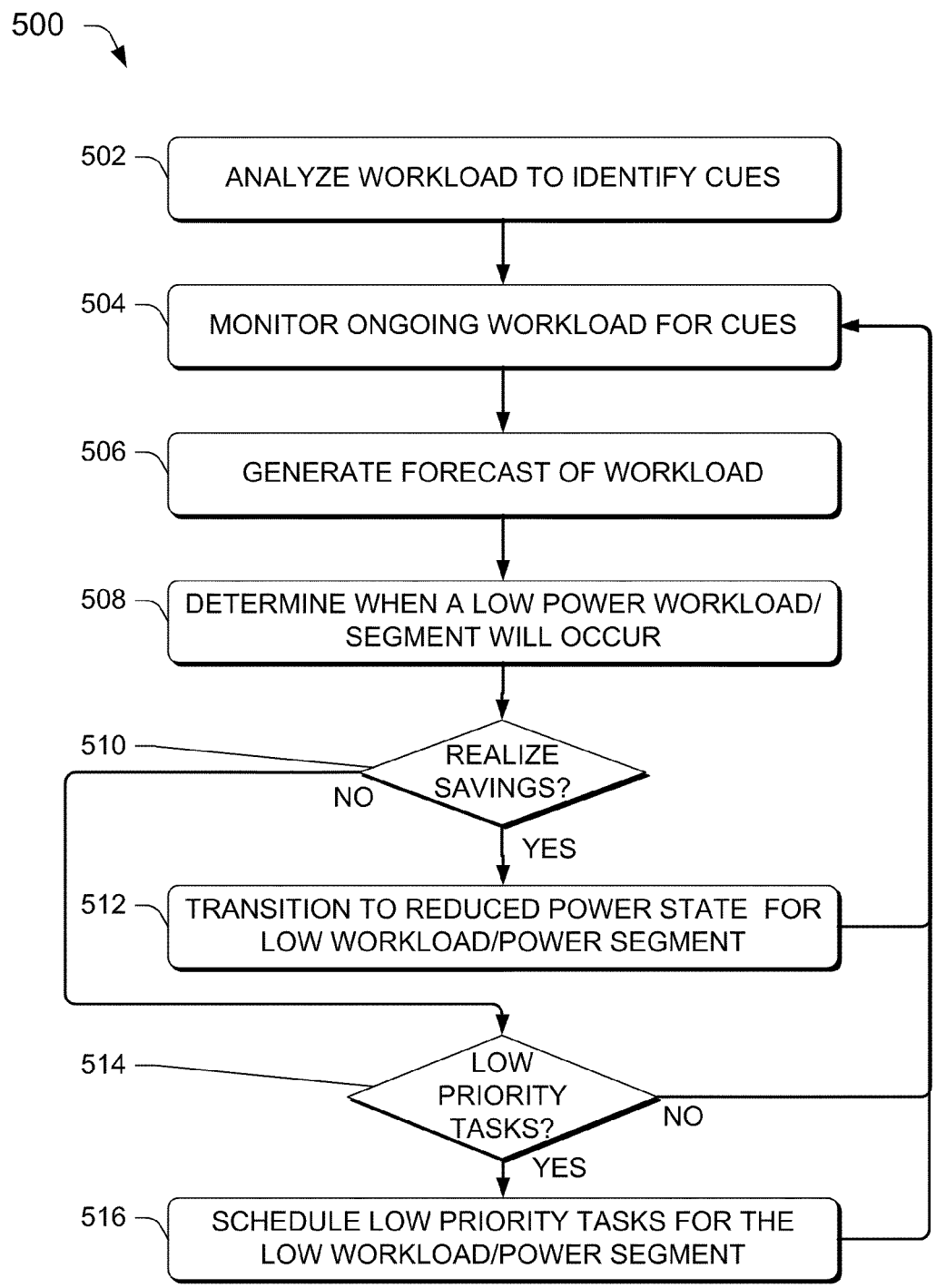
FIG. 5 is a flow diagram of an illustrative process of transitioning to a reduced power state during a reduced power need included in a power-requirement forecast.

FIG. 5 is a flow diagram of an illustrative process 500 of transitioning to a reduced power state during a reduced performance need included in a performance-requirement forecast. The process 500 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 500, shall be interpreted accordingly.

At 502, the analyzer module 116 may analyze workload to identify the cues 410. The cues 410 may be events that enable forecasting future resource consumption of software of the computing device 102. The cues 410 have a correlation with the low performance segments 306 (that relate to low performance needs), which may be included in the forecast 302 and used to selectively reduce the operating power of the hardware to a low power state. In addition, the cues 410 may have a correlation with the micro low performance segments 308, which may be used for selectively scheduling low priority tasks. In some instances, the cues 410 may be user initiated cues.

At 504, the forecast module 118 may monitor ongoing workload for the cues 410. A non-exhaustive list of possible ongoing workload includes resource consumption of the software, application state, command sets, user actions (e.g., keyboard usage, etc.), and so forth.

At 506, the forecast module 118 may generate a forecast of workload when the cue 410 is identified via the monitoring at 504. In some embodiments, the cue 410 may be a single cue that includes a forecasted performance segment to create the forecast 302 shown in FIGS. 3 and 4. In these embodiments, the identification of the cue 410 may generate a forecast based on previously-observed resource consumption, such as the forecast 302 having the low power segment 306 and the micro low performance segments 308. In some embodiments, multiple instances of the cues 410, which may be similar or disparate, may be used to generate the forecast 302 by combining elements of each cue's observed resource consumption history from the history consumption curve 406. In this way, multiple instances of the cues 410 may influence the forecast 302.

At 508, the forecast module 118 may determine when a low power segment associated with a low workload segment is predicted to occur. Prior to a cost-benefit analysis, which may be performed in advance for each hardware state, the low power segment may be classified as the low power segment 306 or the micro low performance segments 308.

At 510, the operating system 108 may determine, based on cost-benefit analysis, whether a reduction in power for the hardware may result in a cumulative power savings. In some embodiments, the cost-benefit analysis may use decision analyses to weigh costs and benefits of a component power transition based on predictions about future workload and/or latency tolerance.

At 512, when a power saving is expected from the decision at 510, the hardware of the computing device 102 may transition to a reduced power state for the low workload/power segment. For example, the hardware may reduce power as shown in the power down state 204 shown in FIG. 2. After the low power state at 512, the process 500 may continue at 504 with continued workload monitoring.

At 514, when the power savings is not expected, per decision 510, the operating system 108 may determine whether to schedule low priority tasks during the micro low power segment 308 and thereby increase utilization of the hardware. For example, when the hardware is a processor, the low priority tasks may include indexing data, improving voice or handwriting recognition software, and so forth. When the hardware is a hard disk, the low priority tasks may include writing backup data to the disk.

At 516, the operating system 108 may schedule the low priority task for the micro low power segment 308 associated with a micro low workload segment. When no low priority tasks occur, or after the low priority tasks are scheduled, the process 500 may return to monitor the workload at 504.

In accordance with various embodiments, the forecast 302 may use machine learning to build a statistical model(s) that predicts probability distributions over future workload from current or recent observations (e.g., the cues). For example, at the operation 504, a machine learning system may monitor workload and update a statistical model of the workload. The statistical models may improve the forecast 302 by incorporating learning concepts rather than purely relying on a repetition of historical events to trigger the forecast.

Figure 6:
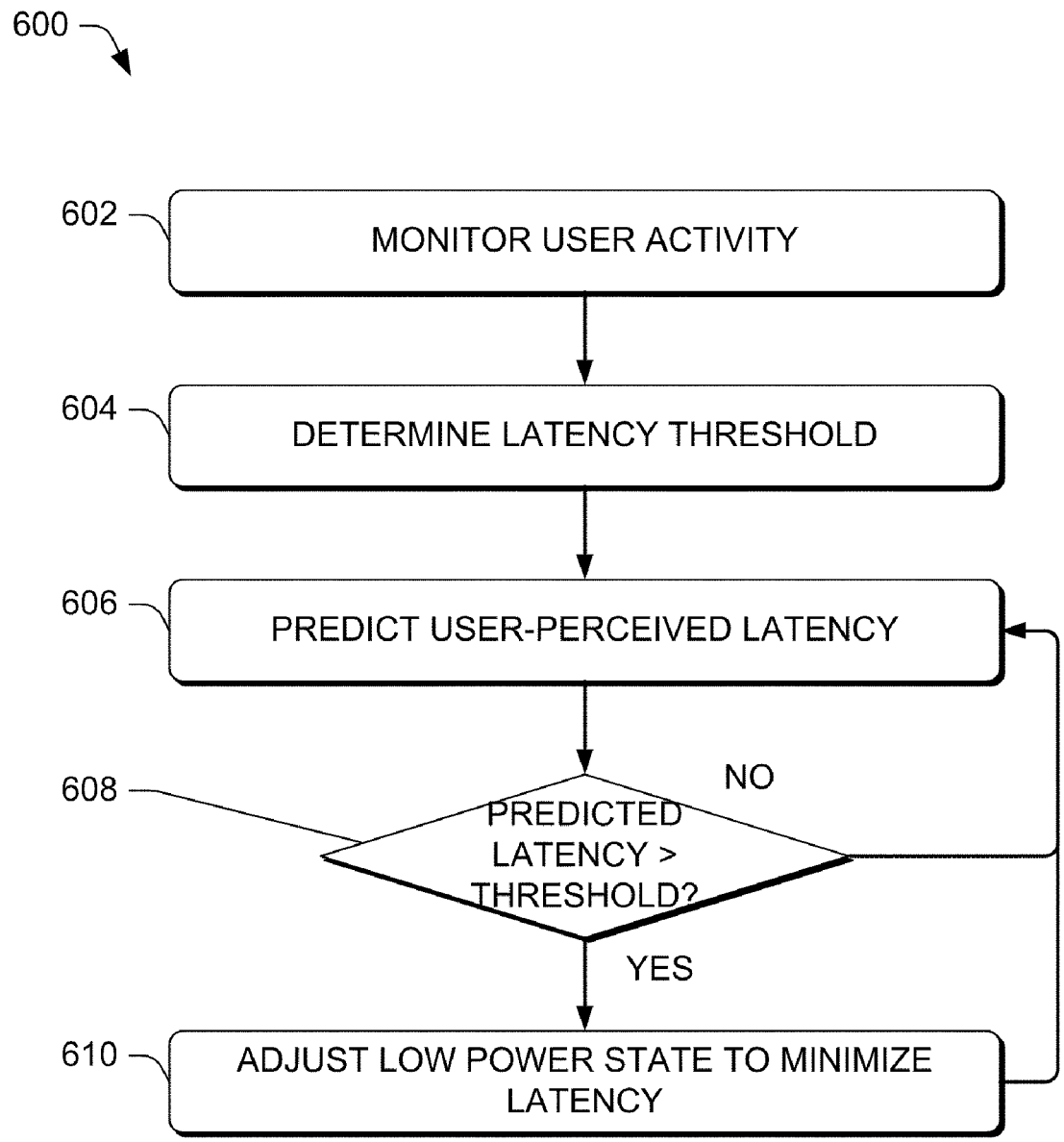
FIG. 6 is a flow diagram of an illustrative process of implementing a dynamic threshold for user-perceived latency.

FIG. 6 is a flow diagram of an illustrative process 600 of implementing a dynamic threshold for the user-perceived latency 206 shown in FIG. 2. In some embodiments, the operations described in the process 600 may be performed by the latency manager 126 shown in FIG. 1. The cost-benefit analysis of the operation 510 of FIG. 5 may include an assessment of the latency threshold 208. When the user-perceived latency 206 is to exceed the latency threshold 208, then the cost-benefit analysis may determine not to reduce the power of the hardware to the power down state 204, or make a reduction of a lesser degree. The process 600 describes operations to determine the latency threshold 208.

At 602, the latency manager 126 may monitor user activity to determine latency requirements. The user may enter a training session and be asked to respond to preferences, tests, or other inputs. In some embodiments, general user interaction with the computing device 102 may be monitored by the latency manager 126. In some embodiments, audio, video, or physical inputs (e.g., keyboard, pointer device, etc.) may be used to receive user input to monitor user activity.

At 604, the latency manager 126 may determine the latency threshold 208. In accordance with embodiments, the latency manager 126 may use the user inputs monitored at the operation 602 to determine the latency threshold 208. For example, when a user expects a result or action on the computing device after a start of an operation, the user may click, tap, or take one or more other repetitive actions that indicate the user now expects to issue another command. The latency manager 126 may measure the length of these events to determine the latency threshold. In additional embodiments, other monitored factors, such as time of day, location, and so forth may be used determine the latency threshold 208.

At 606, the latency manager 126 may determine the user-perceived latency 206, which may be associated with the power up phase 202(4).

At 608, the latency manager 126 may determine whether the user-perceived latency 206 is greater than (or equal to) the latency threshold 208. If the user-perceived latency 206 is not greater than (or equal to) the latency threshold 208, then the process 600 may continue to predict low performance-requirement level at 606.

At 610, the power manager 120 may adjust the power down state 204 to ensure the user-perceived latency does not reach (or exceed) the latency threshold 208. In some embodiments, an instance of the low power segment 306 may not include a reduced power state of the hardware because of the user-perceived latency. Low priority tasks may be performed during this segment similar to the micro low power segment 308 as discussed in the operation 516 of FIG. 5. The process may continue at the operation 606 for further processing by the latency manager 126.

In accordance with various embodiments, the latency manager 126 may use machine learning to build a statistical model(s) that predicts a forthcoming latency tolerance based on current or recent observations. The statistical models may improve the accuracy of the prediction of the latency threshold at 604 and/or the predicted latency at 606 by incorporating learning concepts. For example, the learning model may analyze a user interaction with a machine to determine an ideal latency threshold for that user or a group of users.

Figure 7:
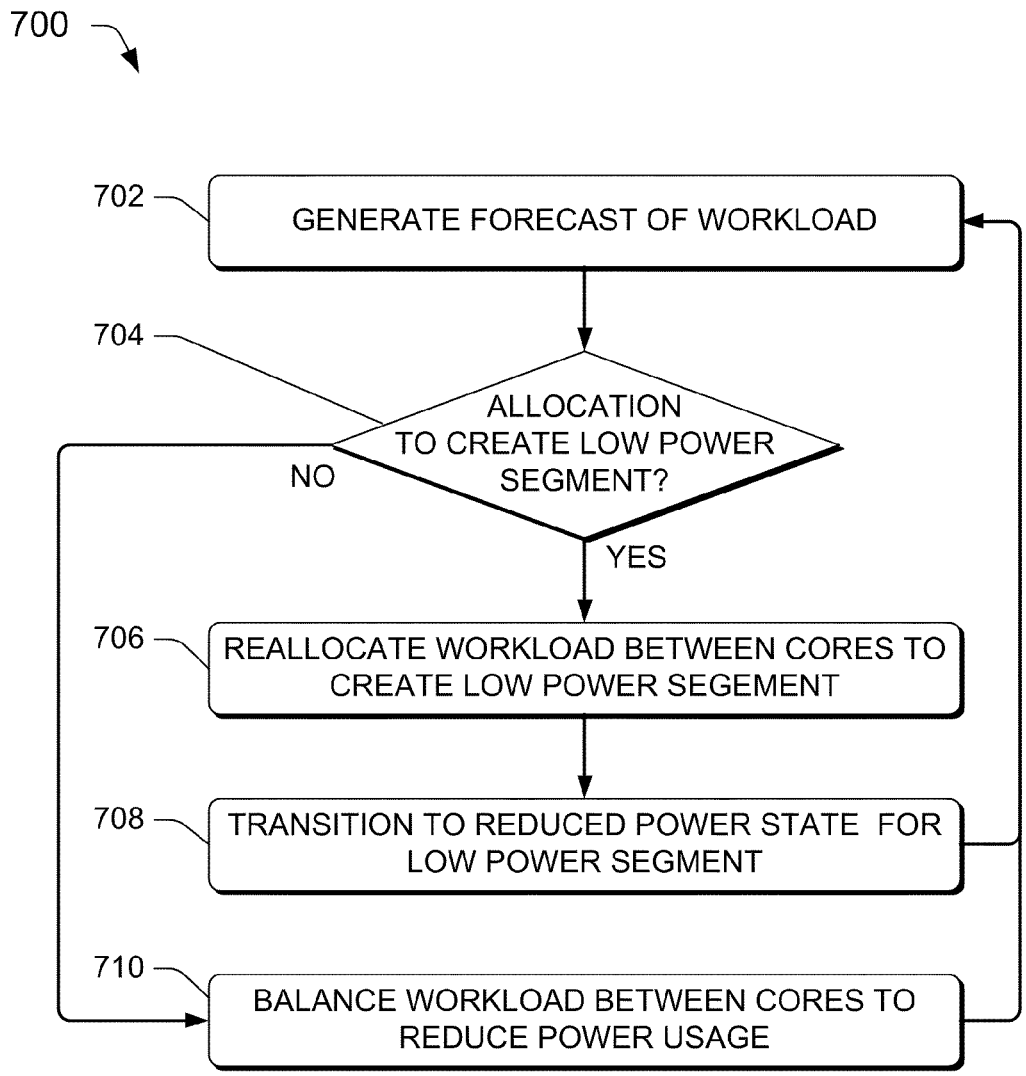
FIG. 7 is a flow diagram of an illustrative process of allocating workloads between cores of multi-core processors.

FIG. 7 is a flow diagram of an illustrative process 700 of allocating workloads between cores of multi-core processors.

At 702, the forecast module 118 may generate a forecast of power consumption of the processors 104 of a multi-core system. For example, the forecast may be generated by the operations 502, 504, 506, and 508 of the process 500.

At 704, the task scheduler 114 may determine whether to allocate workload among the cores of the processors 104 to create a low performance segment. For example, the task scheduler 114 may maintain some cores in a normal power phase while selectively placing other cores in a lower power (performance) state. The cores in the normal power phase may be allocated more work to perform in sequence rather than powering up a core from a lower power state, and using that core to perform more effort in parallel, when such an action is determined to result in a power savings or prevent (or minimize a risk of) exceeding a latency threshold.

When two cores are forecasted to have consecutive instances of the micro low performance segments 308 or other similarly aligned instances of low power use, reallocation of workload may be performed at 706 to shift work from a first core to a second core to create the low power segment 306 for the first core that enables the power down state 204.

At 708, the power manager 120 may transition the reduced workload core to a reduce power state for the low power segment 306. The process 700 may then return to the operation 702.

At 710, when the reallocation may not enable the power down state 204, the task scheduler 114 may balance the workload of the cores to enable running each core at a lower frequency (and voltage), which is more efficient, such as by lowering the P-state of each of the cores. The process 700 may then continue at the operation 702, which may enable continual assessment of processor workload to obtain an overall power savings as compared to operation without the benefit of the forecast of power consumption.

Figure 8A:
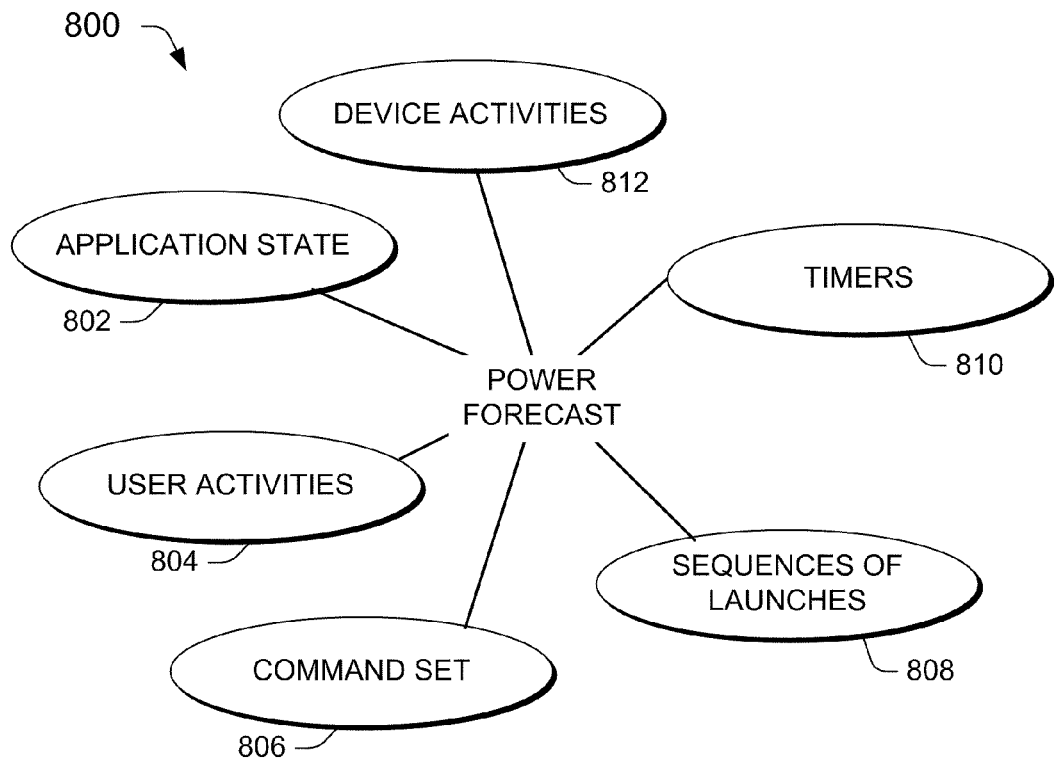
FIG. 8A is a cluster diagram of illustrative inputs to a forecast of power-requirements of a computing device.

FIG. 8A is a cluster diagram of illustrative inputs to a performance forecast 800 of performance-requirements of a computing device. In accordance with embodiments, the performance forecast 800 may be generated by the forecast module 118 at the operation 508 of the process 500 by various events. A non-exhaustive list of possible events may include application state 802, user activities 804, command set 806, sequences of application launches 808, application timers 810, and/or device activities 812. The learning model may use the inputs to a performance forecast 800 to create the statistical model to predict probability distribution over future workload from current or recent observations.

Figure 8B:
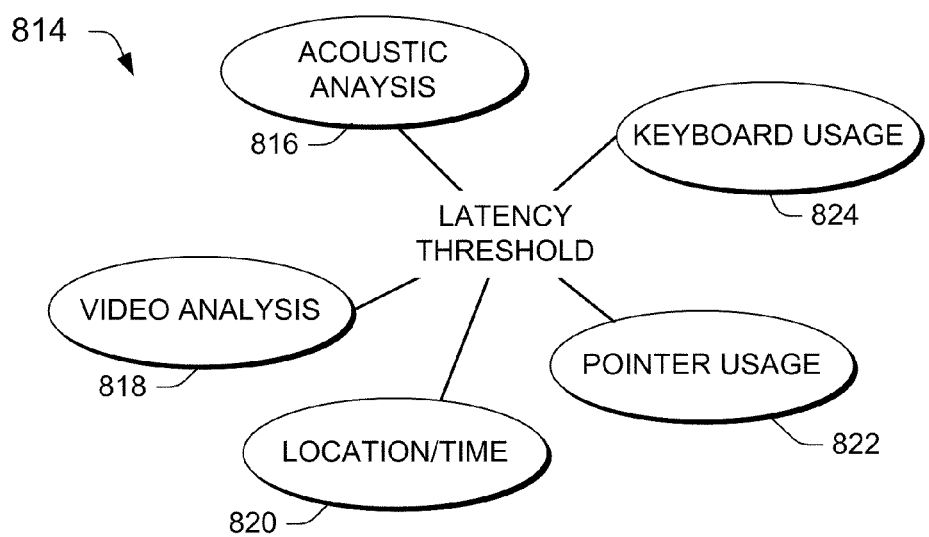
FIG. 8B is a cluster diagram of illustrative inputs to a latency threshold for a user operating the computing device.

FIG. 8B is a cluster diagram of illustrative inputs to a latency threshold 814 for a user operating the computing device. In accordance with embodiments, the latency threshold 800 may be generated by the latency manager 126 at the operation 604 of the process 600 by various events. A non-exhaustive list of possible events may include acoustic analysis 816, video analysis 818, location/time 820, pointer usage 822, and/or keyboard usage 824. For example, the latency threshold may be measured during a training session that includes audio and/or video observation of the user to determine an end of the latency threshold (e.g., movement of the user, sounds from the user, etc.), which may be proved by the acoustic analysis 816 and/or the video analysis 818. As discussed above, the learning model may also use the inputs to a latency threshold 814 to create the statistical model to predict latency (thresholds, perception, etc.) by incorporating learning concepts. Multi-core computing platforms provide opportunities for the joint control of a set of CPUs so as to ideally address forthcoming performance needs at minimal cost of power. The focus is on making a sequence of power assignments to each CPU of a set of available CPUs given predictive performance requirements. Given statistical forecasts about forthcoming performance needs, based on observations about system, applications, and user activities, and the current configuration of the powering of processors, decision analyses can identify ideal updated configurations of power states across all of the CPUs to support predicted performance requirements in a manner that minimizes power usage for the overall system. Such decisions include deliberation about new types actions and tradeoffs in power and performance under the predictions (and uncertainties) about forthcoming performance needs, such as whether to reduce computational operations being done in parallel across multiple CPUs, and instead directing computations to being handled sequentially on one or a subset of more fully powered CPUs. Such decisions made under uncertainty consider the power-performance tradeoff across multiple CPUs, by, e.g., powering down multiple CPUs and shifting computations to one or more fully powered CPU that tackle operations in sequence.

Conclusion

The above-described techniques pertain to using workload and latency-tolerance forecasts based on system and user activity observations to minimize power consumption. Forecasts can be provided by statistical models that take into consideration such evidence as streams of observations about the machine and user activity, including an application and component usage context. Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method of reducing power consumption of a system, the method comprising:

analyzing workload of a processor of the system to build a model that predicts from historical system activities a probability of a forthcoming reduction of the workload and associated performance needs of the processor for a duration of time;

monitoring ongoing computing workload to identify one or more current or recent system activities that are identical or substantially similar to the historical system activities;

generating a forecast of future performance requirements based on the one or more current or recent system activities, the forecast including a predicted length of the forthcoming reduction of the workload; and transitioning to a reduced performance state for a period of time upon a determination that the predicted length of the reduction in workload is long enough such that a cost-benefit analysis shows a net power savings when taking into consideration the power required to transition back to a higher performance state to handle an increase in forthcoming workload.

2. The method as recited in claim 1, wherein the transitioning to a reduced performance state includes adjusting at least one of a P-state or a C-state to a lower power consumption state.

3. The method as recited in claim 1, further comprising deferring the scheduling of low priority tasks to allow an extended idle state.

4. The method as recited in claim 1, further comprising:
  determining a latency threshold;
  predicting a user-perceived latency of the reduced performance state of a low power segment; and
  adjusting the reduced performance state to reduce the user-perceived latency below the latency threshold upon a determination that the user-perceived latency is greater than the latency threshold.

5. The method as recited in claim 4, wherein the latency threshold is determined by monitoring user behavior using machine learning while a user interacts with a computer device having the processor, the machine learning to generate a statistical model to predict probability distributions over future workload from current or recent observations.

6. The method as recited in claim 1, wherein the one or more historical activities include at least one of application state, command sets, and sequences of application launches; and
  wherein the low power consumption occurrences include at least one of machine idle time, user idle time, timers duration, or device data delays.

7. The method as recited in claim 4, wherein the CPU is a multi-core CPU, and
  the method further comprises allocating workload of the forecast between two or more cores to create the low power segment.

8. One or more computer-readable media storing computer-executable instructions that, are executable by one or more processors to cause the one or more processors to perform acts comprising:
  forecasting performance requirements of a computing resource based on historical computing activities to generate a speculative performance curve that includes a low performance segment over an approaching time period; and
  reducing a power state of a computing resource for the low performance segment upon a determination that a forecasted duration of time for the low performance segment enables realization of power savings that are greater than a power debit associated with the reducing.

9. The one or more computer-readable media as recited in claim 8, wherein the acts further comprise:
  determining a latency threshold as a maximum allowable latency for powering up the computing resource; and
  modifying the reduced power state to reduce a user-perceived latency below the latency threshold upon a determination that a power-up phase of the computer resource includes user-perceived latency that is greater than the latency threshold.

10. The one or more computer-readable media as recited in claim 8, wherein the computing resource is a multi-core processor.

11. The one or more computer-readable media as recited in claim 10, wherein the acts further comprise:
  reallocating workload between cores of the multi-core processor to create the low performance segment; and
  balancing the workload of the cores when the low performance segment fails to enable realization of power savings that are greater than the power debit.

12. The one or more computer-readable media as recited in claim 8, wherein the historical computing activities are associated with historical cues, and wherein the speculative performance curve is generated in response to detection of an active cue that is substantially similar to an historical cue.

13. The one or more computer-readable media as recited in claim 8, further comprising allocating low priority tasks during the low performance segment upon a determination that the low performance segment fails to enable realization of power savings that are greater than the power debit.

14. The one or more computer-readable media as recited in claim 13, wherein the low priority tasks are background computing tasks that raise the a processor utilization to full utilization.

15. The one or more computer-readable media as recited in claim 12, wherein the speculative performance curve is generated at least in part by a machine learning model that generates a statistical model to predict a probability distribution over future workload from current or recent observations.

16. A system, comprising:
  one or more processors; and
  memory to store instructions executable by the one or more processors, that upon execution, cause the one or more processors to:
    analyze workload of the computing device to determine historical cues that correlate to low performance occurrences of the computing device;
    generate a forecast of future performance requirements based on monitored cues that are associated with historical cues, the forecast including a duration of time of a low performance segment in the forecast; and
    transition to a reduced power state upon a determination that the duration of time of the low performance segment enables a power savings that is greater than a power debit associated with the transitioning to the reduced power state.

17. The system as recited in claim 16, wherein the historical cues include at least one of application state, sequences of application launches, and command sets.

18. The system as recited in claim 16, wherein the instructions further cause the one or more processors to schedule low priority tasks upon a determination that the duration of time of the low performance segment fails to enable the power savings that is greater than the power debit.

19. The system as recited in claim 16, wherein the computing device is a multi-core processor, and wherein the transition to the reduced power state further includes workload reallocation between two or more cores to create the low performance segment.

20. The system as recited in claim 16, wherein the computing resource is at least one of an input device, removable storage, a communication connection, non-removable storage, or an output device.

* * * * *

UNITED STATES PATENT AND TRADEMARK OFFICE
CERTIFICATE OF CORRECTION

| | | |
|---|---|---|
| PATENT NO. | : 8,190,939 B2 | Page 1 of 1 |
| APPLICATION NO. | : 12/493058 | |
| DATED | : May 29, 2012 | |
| INVENTOR(S) | : Fields, Jr. et al. | |

It is certified that error appears in the above-identified patent and that said Letters Patent is hereby corrected as shown below:

In the Claims

Column 13, line 29, Claim 8, delete "that," and insert -- that --, therefor.

Column 14, line 16, Claim 14, delete "the a" and insert -- the --, therefor.

Signed and Sealed this
Third Day of February, 2015

Michelle K. Lee
*Deputy Director of the United States Patent and Trademark Office*